Oct. 29, 1968 J. N. MULLINS, JR 3,407,618
REFRIGERATION CONTROL MEANS FOR A SLUSH-MAKING MACHINE
Filed Feb. 6, 1967 2 Sheets-Sheet 1

James N. Mullins, Jr.
INVENTOR.

BY
Browning, Simms, Hyer & Eickenroht
ATTORNEYS

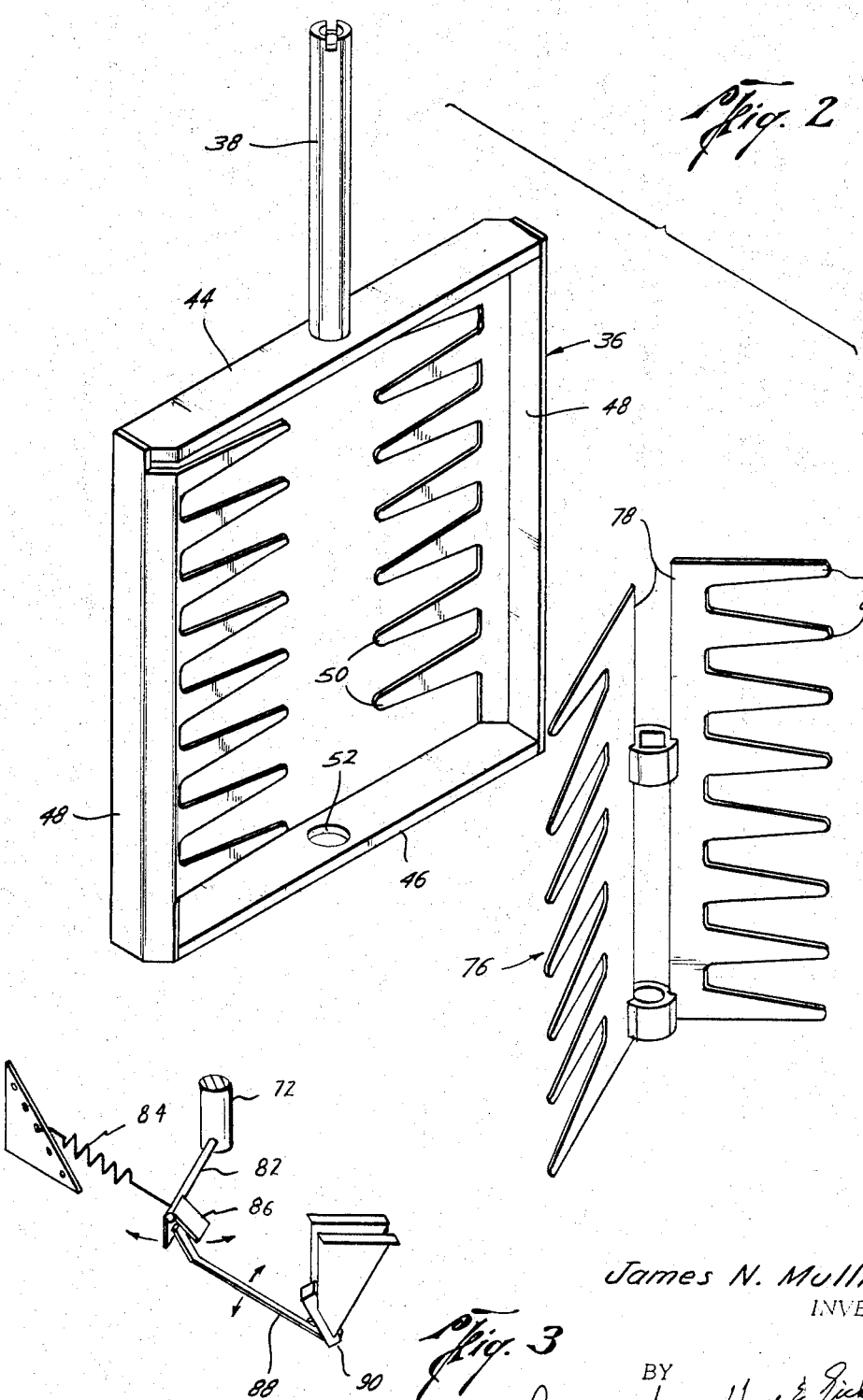

United States Patent Office 3,407,618
Patented Oct. 29, 1968

3,407,618
REFRIGERATION CONTROL MEANS FOR
A SLUSH-MAKING MACHINE
James N. Mullins, Jr., Fort Worth, Tex., assignor to Polar
Chips Manufacturing Company, Fort Worth, Tex.
Filed Feb. 6, 1967, Ser. No. 614,774
2 Claims. (Cl. 62—136)

ABSTRACT OF THE DISCLOSURE

A slush-making machine having a vertical refrigerated tank in which a flavored water mixture is agitated by a motor-driven mixing dasher to produce a slushy or partially frozen drink. The mixing dasher has fingers extending inwardly from vertical side members. A control dasher mounted on a spring-biased shaft is also positioned in the tank. The control dasher has two sets of outwardly extending members at approximately right angles to each other which interlace with the fingers of the mixing dasher. Upon the mixture reaching desired consistency, the viscosity of the mixer will cause the control dasher to angularly move. The end of the shaft on which the control dasher is fixed is operatively connected to a microswitch controlling the refrigeration of the tank so that angular movement of the control dasher turns off the switch for the refrigeration system. Upon the mixture returning to the proper consistency, the spring-biased control dasher returns to its original position and such angular return movement turns on the switch for the refrigeration system.

Background of the invention

This invention relates to slush-making machines and more particularly to a slush-making machine in which the refrigeration of the mixture is controlled by the consistency thereof.

The making of a slush drink from water which has been flavored and sweetened is quite old and usually consists of agitating a flavored water mixture in a refrigerated tank. However, there has been considerable difficulty in constantly maintaining the slush at a proper consistency so that it can be immediately dispensed to a customer. If the mixture is overfrozen, it becomes stiff and hard to dispense.

In order to maintain the mixture of the desirable consistency for proper dispensing it is necessary to constantly cycle the refrigeration equipment. Various means for cycling the refrigeration system have been proposed. Some have been thermostatic in nature and others have been based on sensing the consistency of the mixture. The latter have generally been found to be more practical. One of the more common of such means is to have the switch controlling the refrigeration system operated by the reaction torque of the motor rotating the dasher which agitates the mixture. However, the dasher in addition to agitating the mixture normally scrapes ice off the wall of the tank and a considerable portion of the energy required to rotate the mixing dasher is devoted to this aspect; therefore, the reaction torque is not truly indicative of the consistency of the mixture.

Summary of the invention

In order to provide a more indicative indication of the consistency of the mixture, the present invention incorporates a esparate control dasher in the mixing tank. As in prior art constructions, the slush-making machine has a refrigerated mixing tank and a motor-driven mixing dasher. A spring-biased shaft extends into the mixing tank and a control dasher is nonrotatably mounted thereon. The control dasher will normally remain stationary; however, upon the consistency of the mixture exceeding a predetermined value, the viscosity of the mixture will cause the control dasher to angularly move. A switch which controls the refrigeration system is operably connected to the shaft on which the control dasher is mounted. Therefore, angular movement of the control dasher will result in the switch being operated and the refrigeration system being shut down. Upon the mixture warming and returning to the desired consistency the spring-biased shaft will move the control dasher back to its original position. Such movement will turn on the switch reenergizing the refrigeration system.

Brief description of the drawings

FIG. 2 is a perspective view of the mixing and control dashers.

FIG. 3 is a perspective view of the control system.

Description of the preferred embodiment

Figure 1:
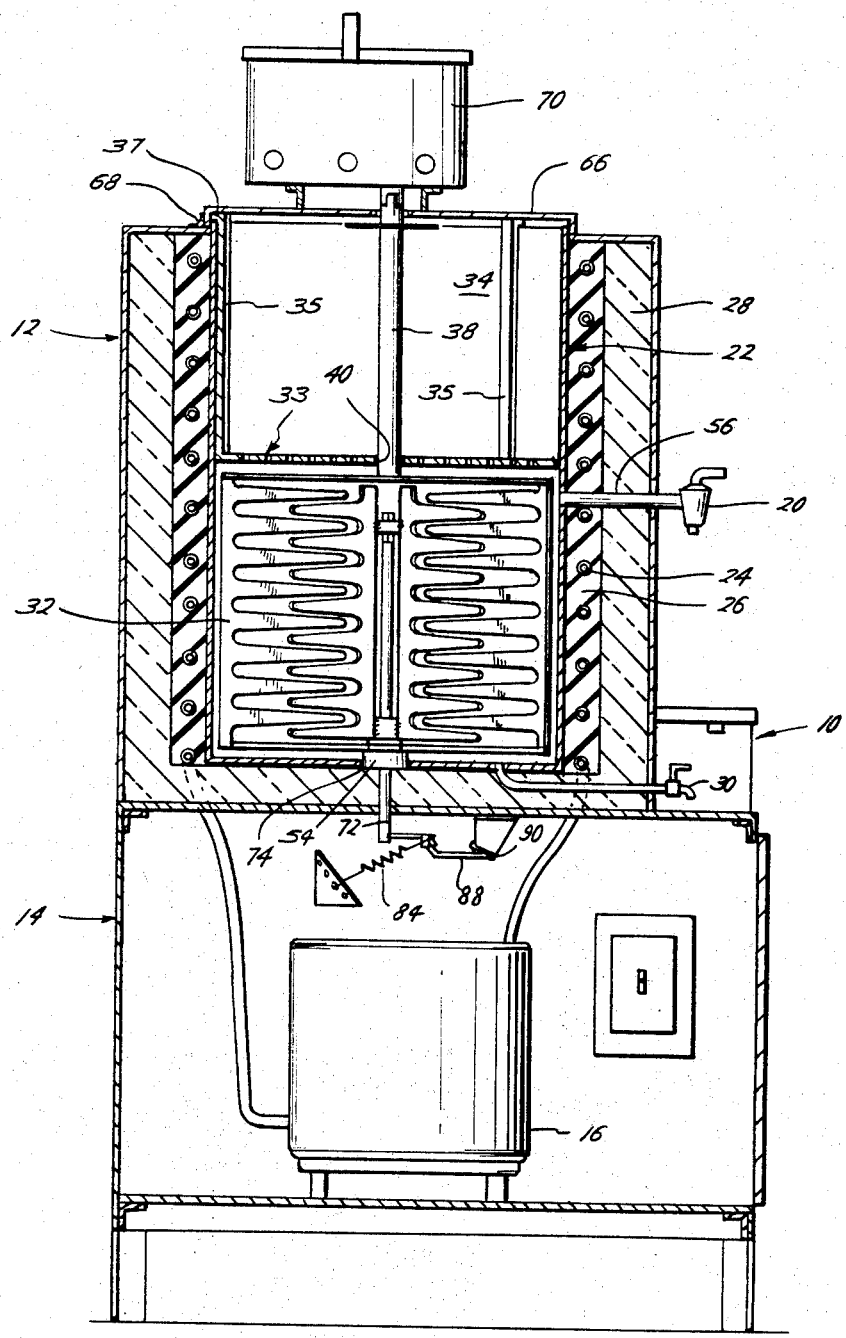
FIG. 1 is a vertical cross-sectional view of a slush-making machine incorporating the control system of the present invention.

Referring now to the drawings, and in particular to FIG. 1, the refrigeration control means of the present invention is shown incorporated in a slush-making machine having a housing 10 divided generally into an upper section 12 and a lower section 14. The housing 10 may be made of any suitable material such as enameled metals, stainless steel, polished aluminum or any combination of these. Inasmuch as a food product is being produced and dispensed by the machines, it is desirable that the housing 10 be constructed so that it projects a sanitary appearance. The upper portion 12 encloses the means for producing, containing and dispensing the slush, as will be discussed subsequently. The lower portion 14, which is in effect the base, encloses and houses mechanical refrigeration equipment 16 which may be of the compressor-condenser-expander type. Easily removable panels or doors may be provided to permit easy access to the refrigeration equipment 16. Also, there is usually sufficient space in the lower section 14 for storage of syrup and other incidentals. As can be seen, the upper section 12 is recessed to provide a ledge 18 which is used to support a cup into which the slush is dispensed through a dispensing valve 20. The ledge 18 is preferably provided with a drip pan connected to a drain. Therefore, any drippings resulting from spilling slush in the dispensing operation may be properly disposed of.

The upper section 12 has an elongated, cylindrical, vertically disposed tank 22 which is preferably made of metal such as stainless steel having a high conductivity for heat therethrough. Surrounding the tank 12 in close heat exchange relation thereto are refrigeration cooling coils 24, preferably in direct contact with the outside surface of the tank 22. The cooling coils 24 are connected to the refrigeration system 16. If desired, removal of heat from the tank 22 may be accomplished by circulating a chilled cooling medium through the coils 24, such medium being chilled by the refrigeration system 16. The cooling coils 24 of the refrigeration system are imbedded in a supporting and insulating material 26 which can conveniently be of a rubber-like nature, asphalt, tar, etc. Such a construction has been found desirable as it positions and maintains the coils 24 in proper heat exchange relation to the tank 22 and provides insulation immediately adjacent to the coils and tank. Additional insulation material 28 is placed between the tank 22 and the vertical walls and bottom wall of upper section 12 of the housing 10. It has been found in practice that so-called Rubbertex insulation is satisfactory. Other materials such as Fiberglas, foam plastic materials, etc., are also suitable. In other words, the cooling coils 24 are mounted in insulation 26 in heat exchange relation to the tank 22, and such insulation 26 forms a well into which the tank 22 can be placed. The remainder of the interior of the upper section 12 is also insulated. The bottom of the tank 22 may be provided with a valved drain line 30 connected to the drain from the drip pan. Therefore, the interior of the tank 22 can be properly cleaned without removing it from the upper section 12. The drain line 30 may be used as a conduit to inject carbon dioxide into the mixture in the freezing compartment of the tank 22 if carbonization is desired.

The tank 22 is divided into a mixing and freezing compartment 32 and a material storage and feed compartment 34. The mixing and freezing compartment 32 is, in effect, the lower portion of the tank 22 and the feed material and storage compartment 34 is, in effect, the upper portion of the tank 22. The compartments may be formed by suspending a perforated partition plate 33 in the tank 22 just above the level of the dispensing valve 20. The plate 33 is provided with three upstanding legs 35 equally spaced about the circumference of the plate 33. Each of the legs 35 is provided with an outturned lip 37 which engages the top of the tank 22 and properly positions the plate 33. In order to agitate the flavored water mixture which is contained in the freezing compartment 32, a mixing dasher 36 is mounted in the freezing compartment. The mixing dasher 36 has a cylindrical shaft 38 which extends upwardly through an opening 40 in the partition plate 33. The partition plate 33 keeps the slush which is formed in the freezing compartment 32 from rising upward into the storage compartment 34. Material in the storage compartment 34 is fed into the freezing compartment 32 to replenish slush which has been dispensed by valve 20 through the perforations in plate 33.

As can be seen in FIG. 2, a generally rectangular open frame having upper and lower laterally extending arms 44 and 46 and vertical side members 48—48 is attached to the bottom of the shaft 38. The dasher 36 is so constructed that the vertical side members have sharpened edges which are spaced, when in operative position, approximately $1/16$ to $1/8$ of an inch from the inner walls of the tank and will, in effect, scrape any ice which is formed on the side walls of the tank from contact therewith. Such action will prevent a buildup of solid ice which is not only deleterious to the mixture but would tend to insulate the tank 22 from the heat exchange relationship with the cooling coils 24. Extending inwardly from the vertical side members 48 are a plurality of longitudinally spaced fingers 50. These fingers 50 aid in agitating the mixture as the dasher 36 is rotated therethrough. The bottom arm 44 is provided with an opening 52 which is journalled in a bearing construction 54 located in the bottom of the tank 22.

During production of the slush and maintenance of the same for dispensing, the dasher 36 rotates relatively slowly in the mixing and freezing compartment 32 of the tank 22 and it is herein where the fruit-flavored slushy food drink produced by the machine is made and maintained.

The slush produced and maintained in the mixing and freezing compartment 32 is withdrawn from the tank 22 preferably from the upper portion of the freezing compartment 32 through dispensing valve 20. A conduit 56 connects the tank 22 with the dispensing valve 20. Flow is maintained by the hydrostatic head of fluid in the material feed and storage compartment 34. As previously mentioned, fluid in the storage compartment 34 can flow through the perforations in the partition plate 33 to replenish the material in the freezing compartment 32.

A lid 66 which fits over the top of the tank 22 is provided to form the top of the housing 10. The lid 66 is preferably made easily removable by a hinge 68 so that the operating mechanism, such as the mixing dasher 36 which is positioned in the tank, may be removed with facility and to provide easy refilling of the water and syrup in the material feed and storage compartment 34. Mounted on top of the lid 66 is a motor 70 which functions to drive the dasher 36. The motor is provided with a gear box so that a relatively slow speed may be maintained. The gear box terminates in a splined shaft and the end of the shaft of the dasher is provided with a complementary spline so that they are in mating engagement. Therefore rotation of the motor 70 rotates the dasher 36.

Extending upwardly into the freezing compartment 32 along its central vertical axis is a shaft 72. The shaft 72 extends through an opening in the bottom of the tank 22 which is provided with a diaphragm-type seal 74 to prevent leakage between the shaft and the opening. The diaphragm seal 74 extends above the bottom to provide the bearing 54 for the dasher 36. The bottom end of the shaft 72 extends into the lower section 14. Nonrotatively mounted on the shaft is a control dasher 76. The control dasher 76 has two vertical vanes 78 positioned at approximately right angles to each other. Extending from the vertical vanes 78 are a plurality of longitudinally spaced outwardly extending fingers 80. The control dasher 76 is so designed that when it is in position in the freezing compartment 32 the outwardly extending fingers 80 of the control dasher 76 are interlaced with the upwardly-extending fingers 50 of the dasher 36.

As mentioned, the lower end of the shaft 72 extends into the lower section 14. The end of the shaft 72 may be provided with a laterally extending member 82. A spring 84 is attached between the frame and the laterally extending member 82 to retain the shaft 72 in a relatively stationary position. Of course, springs other than that type illustrated may be utilized to spring bias the shaft 72. The laterally extending member 82 is provided with a fork 86 which engages the end of an actuating lever 88 of a microswitch 90, which is attached in the lower section 14 in such a position so that it can be operatively connected to the shaft 72. The switch 90 is so constructed and positioned that angular movement of the shaft 72 will result in turning the switch 90 on and off. If desired, the switch may be designed so that there can be some movement of the actuating lever 88 prior to operation of the switch mechanism. The switch 90 is connected to the electrical circuit of the motor-compressor unit of the refrigeration system 16. Therefore, turning on and off operation of the switch 90 will, in effect, energize and de-energize the refrigeration system 16, which controls the distribution of coolant to the coils 24 surrounding the tank 22 and, therefore, in effect, controls the freezing of the mixture contained in the freezing compartment 32.

As mentioned, the control dasher 76 is nonrotatively positioned on the shaft 72 which is spring-biased so that it may remain relatively stationary. Accordingly, the control dasher 76 will remain relatively stationary during the operation of the machine. The mixing dasher 36 will rotate, agitating the mixture while the control dasher 76 will remain in its stationary position. The fingers 50 of the dasher 36 being interlaced with the fingers 80 of the control dasher 76 will permit the mixing dasher 36 to pass through. However, upon the consistency of the mixture reaching its desired value, the viscosity of the mixture will have increased. Therefore, contined agitation of the mixture will result in a force being applied to the control dasher 76 which will overcome the resistive force of the spring 84. Accordingly, there will be angular movement of the control dasher 76 which, in effect, will result in an angular movement of the shaft 72. Consequently, the fork 86 on the laterally extending member 82 will cause the switch arm 88 of the switch 90 to move sufficiently to turn off the switch 90 which will open the line to the compressor unit of the refrigeration system 16. As a result, the supply of coolant to the coils 24 surrounding the freezing compartment 32 will be terminated. As the mixture in the freezing compartment 32 warms and reaches its proper consistency its viscosity will have decreased so that the force of the spring 84 will cause the shaft 72 and dasher 76 to move back to their original positions. The angular movement of the shaft 72 in returning to its original position will naturally rotate the laterally extending member 82 and fork 86 which will move the actuating lever 88 of the switch 90 sufficiently to trip it to the on position. The switch 90 being turned back on re-energizes the refrigeration system 16 and coolant is again supplied to the coils 24 which surround the freezing compartment 32 of the tank 22. Accordingly, the mixture is constantly maintained at the desired consistency for proper dispensing and use.

As mentioned, the vertical vanes 78 and fingers 80 of the control dasher 76 are at approximately right angles to each other. Although the fingers 80 of the control dasher 76 interlace with the inwardly extending fingers 50 of the mixing dasher 36, only one set of fingers 80 of the control dasher 76 is passed by the fingers 50 of the mixing dasher 36 at any one time. Therefore, any pulsations due to the fingers 50 of the mixing dasher 36 passing the fingers 80 of the control dasher 76 are minimized. Accordingly, any movement of the control dasher 76 is more truly reflective of the viscosity of the agitated mixture. At the same time, it is possible to utilize a mixing dasher 36 having laterally extending fingers 50 to assist in proper agitation of the mixture to obtain a proper consistency of the slush.

From the foregoing it can be seen that this invention is one well adapted to attain all the ends and objects hereinbefore set forth, together with other advantages which are obvious and which are inherent to the apparatus.

It will be understood that certain features and subcombinations are of the utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a slush-making apparatus formed of a vertical tank having a chamber in which a water mixture is agitated, refrigeration means mounted and operable relative to said tank to remove heat from said chamber; a mixing dasher mounted in said chamber, said mixing dasher formed of a generally open rectangular frame having a plurality of spaced, inwardly extending fingers on the vertical sides of the frame, power means operably connected to said mixing dasher to rotate same, the improvement comprising: a shaft extending into said chamber; means biasing said shaft to retain it relatively stationary; switch means controlling the operation of the refrigeration means operably connected to said shaft and a control dasher in said chamber nonrotatively mounted on said shaft, said control dasher being formed of two sets of outwardly directed fingers, the fingers being spaced to interlace with the fingers of the mixing dasher, the two sets of fingers being angularly displaced from each other at an angle substantially less than 180 degrees, said control dasher remaining stationary when the consistency of the mixture is below a predetermined level, angularly moving when the consistency of the mixture is above the predetermined level and returning to its original position when the consistency of the mixture returns to the predetermined level, whereby the operation of the refrigeration means is controlled by the consistency of the mixture as sensed by the movement of the control dasher.

2. A slush-making apparatus provided with an automatic control means to maintain the slush at a desired consistency, comprising a vertical tank, the lower part of which forms a mixing chamber; a partition plate positioned inside the tank forming a storage chamber for the mixture; refrigeration means having a cooling coil extending around said tank; a mixing dasher mounted in said mixing chamber and having a shaft extending through the storage chamber, the mixing dasher being formed of a generally open rectangular frame having a plurality of longitudinally spaced fingers extending inwardly from the vertical side members; power means positioned on top of the tank and operably connected to the mixing dasher to rotate it; a control dasher in said mixing chamber, said control dasher having two vertical vanes, each with longitudinally spaced, outwardly extending, lateral fingers, the two sets of the fingers being at approximately right angles to each other, the fingers of the control dasher interlacing with the fingers of the mixing dasher; a shaft extending upwardly through the bottom of the tank, the control dasher nonrotatively mounted on said shaft; spring means biasing said shaft and switch means controlling the operation of the refrigeration means operably connected to said shaft, whereby the operation of the refrigeration means is controlled by the viscosity of the mixture as sensed by movement of the control dasher.

References Cited

UNITED STATES PATENTS

| | | | |
|---|---|---|---|
| 2,828,621 | 4/1958 | Von Rosenberg | 73—59 |
| 2,992,651 | 7/1961 | Krofta | 73—59 X |
| 3,069,866 | 12/1962 | Dunn | 62—354 X |
| 3,298,190 | 1/1967 | Harker. | |

ROBERT A. O'LEARY, *Primary Examiner.*

W. E. WAYNER, *Assistant Examiner.*